(12) United States Patent
Jimbo et al.

(10) Patent No.: US 9,887,659 B2
(45) Date of Patent: Feb. 6, 2018

(54) NETWORKED MOTOR CONTROLLER WITH SAFETY CONTROL UNIT

(71) Applicant: OMRON CORPORATION, Kyoto-shi, Kyoto (JP)

(72) Inventors: Ryuichi Jimbo, Kusatsu (JP); Takao Ushiyama, Ritto (JP); Masakazu Matsugami, Ritto (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/413,527

(22) Filed: Jan. 24, 2017

(65) Prior Publication Data
US 2017/0272025 A1    Sep. 21, 2017

(30) Foreign Application Priority Data

Mar. 15, 2016    (JP) .................................. 2016-051575

(51) Int. Cl.
*G05B 5/00* (2006.01)
*H02H 7/08* (2006.01)
(Continued)

(52) U.S. Cl.
CPC ............ *H02P 29/024* (2013.01); *H02P 27/08* (2013.01); *H02P 29/00* (2013.01); *H04L 67/12* (2013.01)

(58) Field of Classification Search
CPC .................................. H02P 29/024; B60L 3/04
(Continued)

(56) References Cited

U.S. PATENT DOCUMENTS

2006/0261749 A1*  11/2006  Campbell ........... H02P 29/0241
                                                            315/291
2010/0327667 A1   12/2010  Fujita et al.
(Continued)

FOREIGN PATENT DOCUMENTS

EP    1717653 A2    11/2006
EP    2541349 A2    1/2013
(Continued)

OTHER PUBLICATIONS

The extended European search report (EESR) dated Nov. 2, 2017 in a counterpart European patent application.

*Primary Examiner* — Erick Glass
(74) *Attorney, Agent, or Firm* — Metrolexis Law Group, PLLC

(57) ABSTRACT

A safety system has higher user design flexibility. Motor controllers (20, 30) include a motor drive circuit (207) that outputs a motor voltage command signal for driving motors (90, 100) in accordance with a motor drive command value, an inverter (211) that supplies power for driving the motors (90, 100) by switching based on the motor voltage command signal, a safety control unit that outputs a drive permission signal for driving the motors (90, 100) in accordance with communication data received through a communication circuit (213), a cut-off circuit (209) that receives the drive permission signal and the voltage drive command signal and cuts off the voltage drive command signal to an inverter (211) when receiving no drive permission signal, and a safety input unit (205) that receives redundant safety input signals. The cut-off circuit (207) receives a logical AND of the safety input signal and the drive permission signal.

6 Claims, 4 Drawing Sheets

(51) Int. Cl.
*H02P 1/00* (2006.01)
*H02P 3/00* (2006.01)
*H02P 29/024* (2016.01)
*H02P 27/08* (2006.01)
*H02P 29/00* (2016.01)
*H04L 29/08* (2006.01)

(58) Field of Classification Search
USPC .......................................................... 318/452
See application file for complete search history.

(56) References Cited

U.S. PATENT DOCUMENTS

| | | |
|---|---|---|
| 2011/0241447 A1 | 10/2011 | Ando et al. |
| 2011/0285335 A1* | 11/2011 | Tada .................... H02H 7/0844 318/400.22 |
| 2012/0213649 A1* | 8/2012 | Sumi ....................... F04B 35/04 417/410.1 |
| 2014/0103883 A1* | 4/2014 | Mitsutani ................ B60L 1/003 320/162 |

FOREIGN PATENT DOCUMENTS

| | | |
|---|---|---|
| JP | 2011-229359 A | 11/2011 |
| JP | 2013-005577 A | 1/2013 |

* cited by examiner

NETWORKED MOTOR CONTROLLER WITH SAFETY CONTROL UNIT

FIELD

The present invention relates to a motor controller with a safety function connected to a network.

BACKGROUND

A motor controller known in the art connected to a network may control driving of a motor based on a safety signal that is input through the network. A safety control system described in Patent Literature 1 performs processing associated with safety communication including transmission and reception through the network under cooperation between a controller for controlling a motor and a safety processing unit, and prevents delays in performing processing associated with safety.

To comply with the safety standards, a motor controller known in the art includes components that are associated with safety and components that are not associated with safety. A motor controller described in Patent Literature 2 includes a safety extension module, which monitors the driving status of a motor. The safety extension module is connected to a power supply for supplying power from the motor controller to the motor. The safety extension module receives a safety signal from, for example, a safety controller, and outputs a signal for cutting power supply from the motor controller to the motor to cut off the motor torque in a safe manner.

CITATION LIST

Patent Literature

Patent Literature 1: Japanese Unexamined Patent Application Publication No. 2013-005577
Patent Literature 2: Japanese Unexamined Patent Application Publication No. 2011-229359

SUMMARY

Technical Problem

To achieve the safety function of the motor controller, as described above, the motor controller commonly includes separate functional blocks for processing associated with safety and for controlling a motor. As described in Patent Literature 1, the safety control system may be designed to stop its output to a motor based on a message from a host device or a safety controller connected to the system with a network, or may be designed to stop its output to a motor based on a safety input signal transmitted through wiring that is directly connected to the system without a network. When any such system known in the art includes separate blocks for achieving the safety function and for controlling the output to the motor, the system can have only either of the above designs. This lowers the flexibility in designing the safety system.

One or more aspects of the present invention are directed to a motor controller that increases user flexibility in designing a safety system.

Solution to Problem

In response to the above issue, a motor controller according to one aspect of the present invention is connected to a network, and includes a communication circuit that transmits and receives a signal through the network, a motor control unit that outputs a motor drive command value for driving a motor in accordance with a command value received through the communication circuit, a motor drive circuit that outputs a motor voltage command signal for driving the motor in accordance with the motor drive command value, an inverter that supplies power for driving the motor by switching based on the motor voltage command signal, a safety control unit that outputs a drive permission signal for driving the motor in accordance with communication data received through the communication circuit, a cut-off circuit that receives the drive permission signal and the motor voltage command signal, and cuts off the motor voltage command signal to the inverter when receiving no drive permission signal, and a safety input unit that receives a redundant safety input signal. The cut-off circuit receives a logical AND of the safety input signal and the drive permission signal.

This structure allows the motor to shift to a safe status based on safety communication including reception through a field network, and also based on a safety input signal.

In the motor controller according to the aspect of the present invention, the safety control unit further includes a safety communication unit that processes safety data included in the communication data in accordance with a predetermined protocol, and a safety processing unit that outputs no drive permission signal when the safety data that has been processed by the safety communication unit includes a signal for placing the motor into a safe status.

In the motor controller according to the aspect of the present invention, the safety control unit further includes a self-diagnosis unit that inputs a self-diagnostic signal onto an input path for receiving the drive permission signal and determines whether an abnormality has occurred on the input path in accordance with information indicated by the self-diagnostic signal.

In the motor controller according to the aspect of the present invention, the motor controller outputs no motor drive command value when the cut-off circuit is cutting off the motor voltage command signal.

Advantageous Effects

Embodiments of the present invention increase user flexibility in designing the safety system.

DETAILED DESCRIPTION

Configuration of Control System

Figure 1:
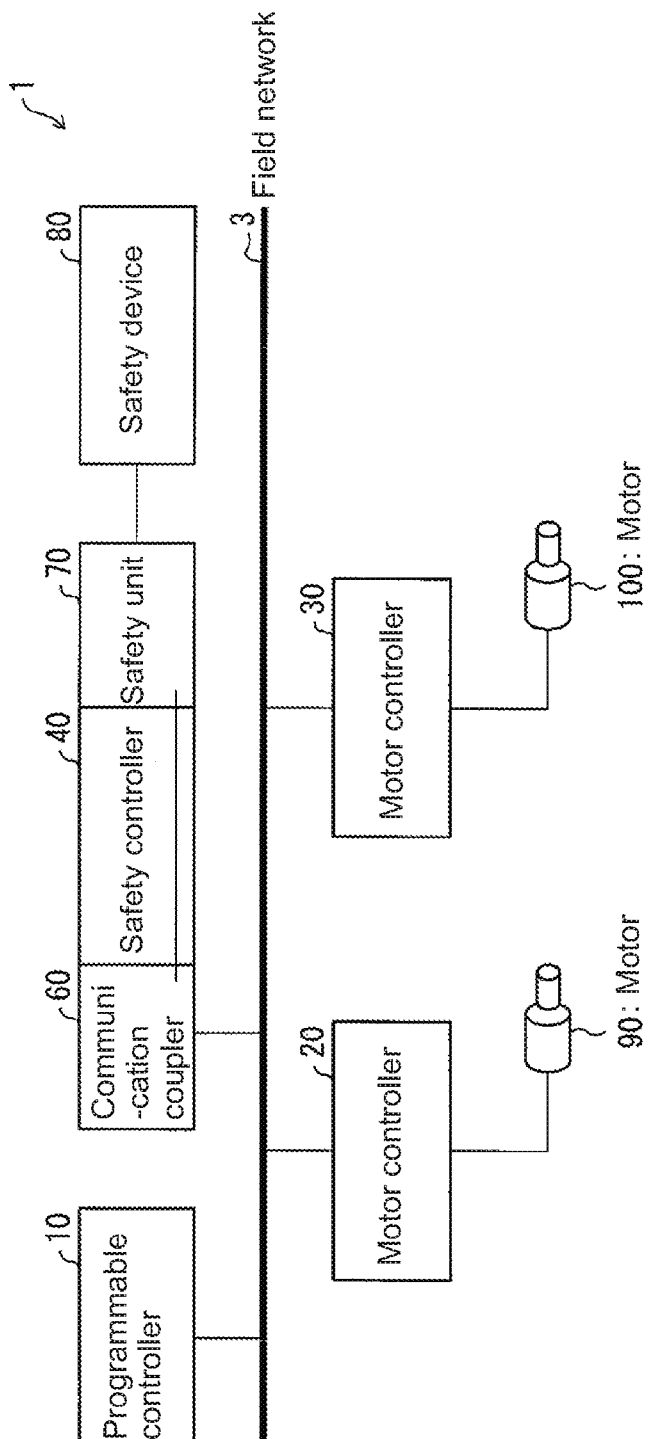
FIG. 1 is a diagram showing a control system including a motor controller according to one embodiment of the present invention.

A control system including a motor controller will now be described with reference to FIG. 1.

A control system 1 typically includes a programmable controller 10, motor controllers 20 and 30, a safety controller 40, a communication coupler 60, and a safety unit 70.

The programmable controller 10 is connected to the motor controllers 20 and 30 with a field network 3.

The programmable controller 10 performs arithmetic operations in every predetermined period, and periodically transmits a command value to the motor controller 20 through the field network (system bus) 3 to control a control target via the motor controller 20.

The motor controller 20 is typically a servo driver. The motor controller 20 receives a command value transmitted from the programmable controller 10, and drives the motor 90 (100) in accordance with the received command value.

A command value that is transmitted periodically from the programmable controller 10 may be a position command value or a velocity command value.

The field network transmits various sets of data, which are transmitted between the programmable controller 10, the safety controller 40, and the motor controllers 20 and 30. The field network may be one of various networks, including EtherCAT (registered trademark), Profinet (registered trademark), MECHATROLINK (registered trademark), and DeviceNET (registered trademark).

The safety controller 40 is connected to the programmable controller 10, a safety unit (not shown), and the motor controllers 20 and 30 with the field network in a communicable manner. The safety controller 40 is connected to the safety unit 70 with a field network or with a system bus. The safety controller 40 performs an operation using an input from a safety slave including the safety unit 70 by executing a safety program, and transmits the operational result to the safety slave.

For example, the safety control system 1 includes an emergency stop switch, which functions as a safety device 80. The safety controller 40 receives information indicating that the emergency stop switch has been pressed as an input from the safety unit. The safety controller 40 then executes a safety program using the input from the safety unit, and transmits a signal carrying an instruction to stop to the safety unit through the field network. Signals associated with safety transmitted through the field network include a data telegram defined with a predetermined protocol. The safety controller 40 and the safety unit are capable of converting data into the format complying with the predetermined protocol and are also capable of analyzing a predetermined data telegram. The safety controller 40 and the safety unit can transmit and receive data associated with safety through the field network.

In the present embodiment, the motor controllers 20 and 30 function as safety units. More specifically, the motor controllers 20 and 30 receive a signal associated with safety from the safety controller 40 through the field network, and then shift the motors 90 and 100 to a safe status. Although the details are described later, the motor controllers 20 and 30 receiving a stop signal through the field network shift the motors to a safe status typically by cutting the voltage supply to the motors to cut off the torque produced by the motors.

Figure 2:
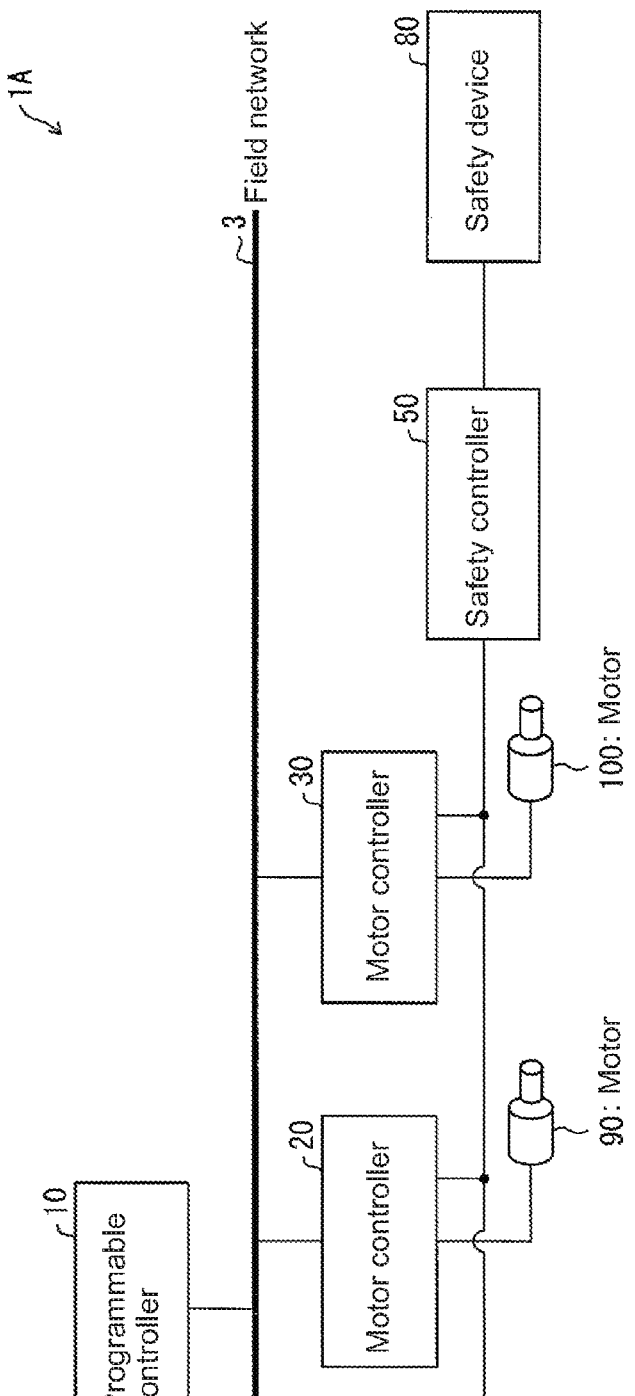
FIG. 2 is a diagram showing a control system including a motor controller according to another embodiment of the present invention.

A control system according to another embodiment including a motor controller will now be described with reference to FIG. 2.

A control system 1A typically includes a programmable controller 10, motor controllers 20 and 30, a safety controller 50, and a safety device 80. The safety controller 50 is connected to the safety device 80 with wiring. The safety controller 50 is connected to the motor controllers 20 and 30 with wiring. The safety controller 50 performs an operation using an input from the safety device 80 as an input for a predetermined safety program, and outputs the operational result to the safety device 80. A typical example of the safety device 80 is an emergency stop switch. When the emergency stop switch is pressed, a stop signal is input into the safety controller 50 through the wiring. The safety controller 50 then performs an operation in accordance with a program using an input from the emergency stop switch, and outputs a safety input signal to the motor controllers 20 and 30, which are connected with wiring. When a safety input signal is input into the motor controllers 20 and 30 through the wiring, the motor controllers 20 and 30 shift the motors 90 and 100 to a safe status by cutting the voltage supply to the motors 90 and 100 to cut off the torque produced by the motors 90 and 100, although the details are described later.

Configuration of Motor Controller

Figure 3:
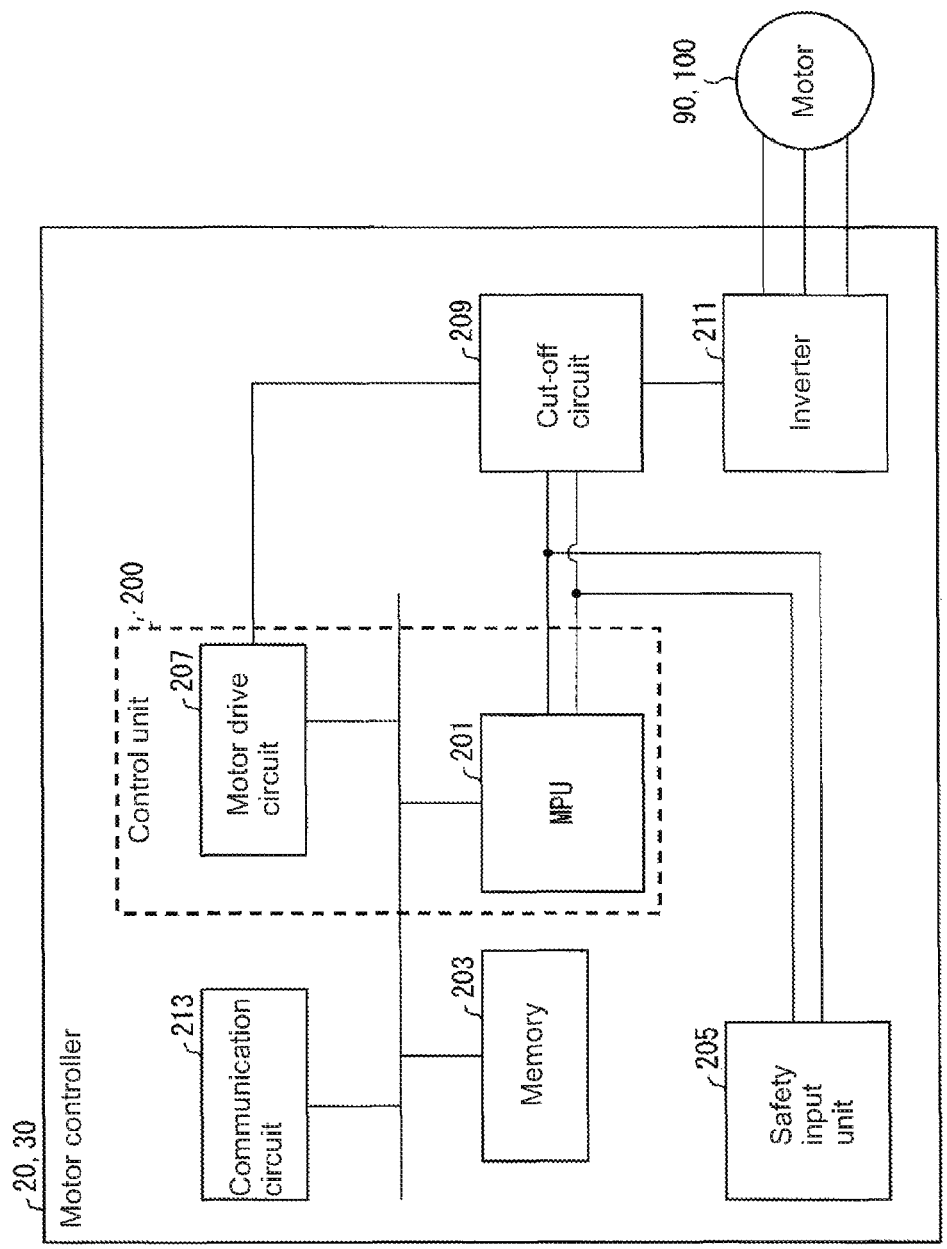
FIG. 3 is a diagram showing the configuration of the motor controller according to one embodiment of the present invention.

The configuration of the motor controller according to the embodiment of the present invention will now be described with reference to FIG. 3.

Each of the motor controllers 20 and 30 typically includes a microprocessor unit (MPU) 201, a memory 203, a safety input unit 205, a motor drive circuit 207 that performs an operation to obtain a motor drive signal for driving the motor 90 or 100, and a cut-off circuit 209.

The MPU 201 reads and executes a program module stored in the memory 203 to function as a control unit 200 for controlling the motor in accordance with a command value.

The MPU 201 typically performs an operation to obtain a motor drive command value for driving the motor 90 or 100 based on a deviation between a command value transmitted from the programmable controller 10 through the network and the value of the current position of the motor 90 or 100 that is measured by a position sensor (not shown). The motor drive command value is typically a torque value, but may be a current value or a voltage value.

The motor drive circuit 207 outputs a pulse width modulation (PWM) signal for driving the motor 90 or 100 based on a deviation between a motor drive command value and the value of a current flowing between the motor 90 or 100 and an inverter 211.

The inverter 211 applies an alternating voltage to the motor 90 or 100 by switching a direct-current power supply in accordance with the PWM signal output from a dedicated circuit.

The safety input unit 205 is typically a safety connector. The safety input unit 205 can receive redundant safety input signals that are input from two systems.

The cut-off circuit 209 is arranged between the dedicated circuit and the inverter 211, and cuts the supply of a drive voltage to the motor based on a safety input signal and an output permission signal. The cut-off circuit 209, which is typically a switching circuit, receives a PWM signal, a safety input signal, and an output permission signal. When the safety input signal and the output permission signal indicate a permitted state, the cut-off circuit 209 provides the PWM signal to the inverter 211. When the safety input signal does not indicate a permitted state, the cut-off circuit 209 provides no PWM signal to the inverter 211 to cut the voltage supply from the inverter 211 to the motor 90 or 100.

Configuration of Safety Control Unit

The MPU 201 included in each of the motor controllers 20 and 30 reads and executes a software module stored in the memory 203 to control the motor 90 or 100 and also to function as a safety control unit. The control unit included in the motor controller will now be described with reference to FIG. 4.

The control unit 200 includes a motor control unit 221 and a safety control unit 223. The motor control unit 221 outputs a motor drive command value for driving the motor 90 or 100 to the motor drive circuit 207 in accordance with a command value transmitted from a host controller, such as the programmable controller 10, through the field network 3, and a feedback value indicating the position or the velocity of the motor 90 or 100 output from the position sensor (not shown).

The safety control unit 223 is designed independently of the motor control unit 221, and includes a safety communication unit 231, a safety processing unit 233, and a self-diagnosis unit 235. The safety communication unit 231 analyzes and reads a safety signal transmitted and received through the field network 3 by following a predetermined procedure. The safety communication unit 231 controls reading and writing of a safety signal, and also monitors whether an abnormality has occurred in the communication, or in transmission and reception through the field network 3. When receiving a safety signal including no stop signal transmitted and received through the field network 3, and receiving no notification about a communication abnormality from the safety communication unit 231, the safety processing unit 233 outputs a drive permission signal to the cut-off circuit 209. When receiving a notification about a communication abnormality from the safety communication unit 231, and receiving a safety signal including no stop signal, the safety processing unit 233 stops outputting a drive permission signal. The self-diagnosis unit 235 monitors the output of a self-diagnostic signal to determine whether an abnormality has occurred in the internal circuits of the motor controllers 20 and 30. This enables the safety function of the motor controllers 20 and 30. The self-diagnosis unit 235 may also detect an abnormality in a power supply circuit for operating the cut-off circuit 209 and the safety control unit 223.

The safety control unit 223 may stop outputting a drive permission signal when the self-diagnosis unit 235 detects an abnormality, in addition to when receiving a safety signal including a stop signal or when a communication abnormality has occurred on the field network 3.

Operation of Motor Controller

The operation of the motor controllers 20 and 30 performed when a safety input signal is input through the safety input unit 205 will now be described with reference to FIG. 3. When a power signal for supplying power to the motors 90 and 100 is set on, the motor controllers 20 and 30 start supplying power to the motors 90 and 100. When either a safety input signal 1 or a safety input signal 2 is set off through the safety input unit 205, a drive voltage supplied from the inverter 211 to the motors 90 and 100 is cut off through the cut-off circuit 209 to stop the power supply to the motors 90 and 100. This achieves the state of no torque produced from the motors 90 and 100. At substantially the same time, a safe monitor signal is set on. More specifically, when the output permission signal is off, the safety input signal is set on in response to an input of a safe monitor signal. The safe monitor signal is then input into the safety controller through the safety input unit. For example, the safety controller monitors a safe monitor signal to determine the status of the motor controllers 20 and 30.

The operation of the motor controllers 20 and 30 performed when a safety input signal is input through the field network 3 will now be described with reference to FIG. 3. A stop signal as a safety signal is input from the safety controller, which is connected with the field network 3, into the motor controllers 20 and 30. The safety control unit 223 analyzes the safety signal. When the safety signal includes a stop signal, the safety control unit 223 cuts off the drive permission signal. When a safety input signal is input, the control unit 200 cuts the voltage supplied from the inverter 211 to the motors 90 and 100 through the cut-off circuit 209. This achieves the state of no torque produced from the motors 90 and 100.

Substantially at the same time, the control unit 200 transmits an active safety status signal to the host device through the field network 3. The safety controller 40 monitors the safety status signal to determine the status of the motor controllers 20 and 30.

The relationship between the driving status of the motor controller 20 or 30 and the safety input signal and the drive permission signal will now be described. When the safety input signal and the drive permission signal are both on, the cut-off circuit 209 provides a motor drive signal to the inverter 211 to drive the motor 90 or 100. When the safety input signal is off and the drive permission signal is on, the cut-off circuit 209 cuts off the motor drive signal to achieve the state of no torque produced from the motor 90 or 100. When the safety input signal is on and the drive permission signal is off, the cut-off circuit 209 cuts off the motor drive signal to achieve the state of no torque produced from the motor 90 or 100. When the safety input signal and the drive permission signal are both off, the cut-off circuit 209 cuts off the motor drive signal to achieve the state of no torque produced from the motor.

The logical AND of the safety input signal input through the wiring and the output permission signal output from the safety control unit 223 in response to the stop signal included in the safety signal transmitted through the network is input to the cut-off circuit 209. This structure achieves the state of no torque produced from the motors 90 and 100 in response to a safety signal input through either the wiring or the network.

Self-Diagnosis Function of Motor Controller

Figure 4:
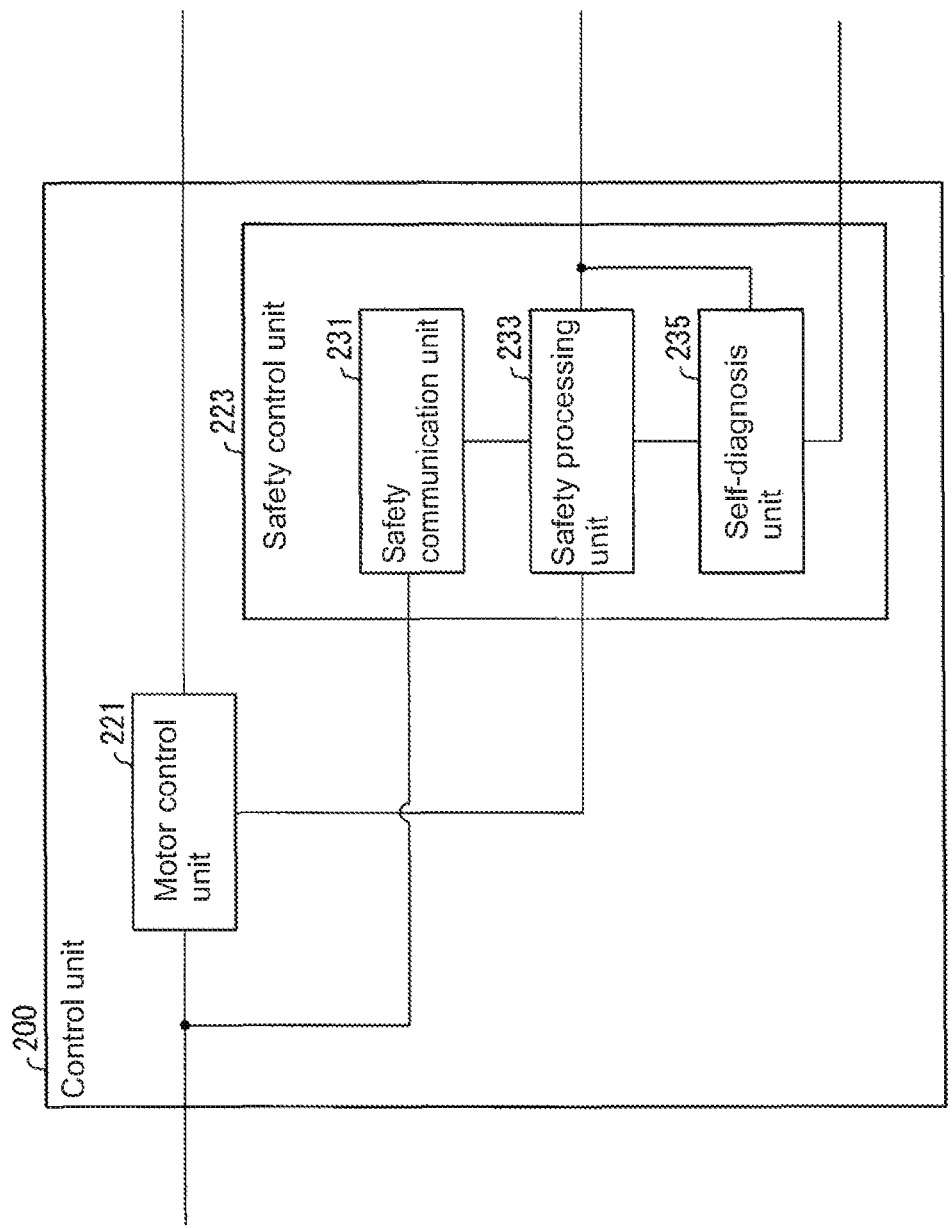
FIG. 4 is a functional block diagram showing the configuration of a control unit included in the motor controller according to one embodiment of the present invention.

The function of self-diagnosis of the signal path for a safety signal will now be described with reference to FIG. 4.

The position for obtaining a monitor signal when a safety input signal is input will now be described with reference to FIG. 3.

The MPU 201 outputs a self-diagnostic signal as an input into the cut-off circuit 209. The self-diagnostic signal is an input pulse signal that rises and falls at predetermined time intervals. A safety input circuit (not shown) includes a filter for removing a self-diagnostic signal. The filter determines that a safety input signal has been input only when detecting a falling edge of a signal after a predetermined time interval or longer.

The MPU 201 outputs a self-diagnostic signal, and monitors a falling edge of a pulse signal before the self-diagnostic signal is input into the filter to determine whether an abnormality has occurred on the path between the MPU 201 and the cut-off circuit 209. When determining that an abnormality has occurred on the path, the MPU 201 activates the cut-off circuit 209 to stop applying a voltage to the motors 90 and 100 and also stop outputting a motor drive command value to the motor drive circuit 207.

Advantageous Effects

The motor controllers 20 and 30 according to embodiments of the present invention each include the cut-off circuit 209, which drives the inverter 211 to stop applying a voltage to the motors 90 and 100 when any signal output from the safety control unit 223 or input through the safety input unit 205 includes a safety input signal. The motor controllers 20 and 30 stop the power supply from the inverter 211 to the motors 90 and 100 when receiving any signal including a safety input signal input from the safety input unit 205 or the safety control unit 223.

This structure can stop the power supply to the motors 90 and 100 when the safety input signal is input through the network, or is input from the safety input unit 205, and increases the flexibility in designing the safety control system 1 including the motor controllers 20 and 30.

The embodiments disclosed herein should not be construed to be restrictive, but may be modified within the spirit and scope of the claimed invention. The technical features disclosed in different embodiments may be combined in other embodiments within the technical scope of the invention.

REFERENCE SIGNS LIST 1 safety control system
40, 50 safety controller
3 system bus
10 programmable controller
20, 30 motor controller
80 safety device
90, 100 motor
200 control unit
201 MPU
203 memory
205 safety input unit
207 motor drive circuit
209 cut-off circuit
211 inverter
213 communication circuit
221 motor control unit
223 safety control unit
231 safety communication unit
233 safety processing unit
235 self-diagnosis unit

The invention claimed is:

1. A motor controller connected to a network, the motor controller comprising:
   a communication circuit configured to transmit and receive a signal through the network;
   a motor control unit configured to output a motor drive command value for driving a motor in accordance with a command value received through the communication circuit;
   a motor drive circuit configured to output a motor voltage command signal for driving the motor in accordance with the motor drive command value;
   an inverter configured to supply power for driving the motor by switching based on the motor voltage command signal;
   a safety control unit configured to output a drive permission signal for driving the motor in accordance with communication data received through the communication circuit;
   a cut-off circuit configured to receive the drive permission signal and the motor voltage command signal, and cut off the motor voltage command signal to the inverter when receiving no drive permission signal; and
   a safety input unit configured to receive a redundant safety input signal,
   wherein the cut-off circuit is configured to receive a logical AND of the safety input signal and the drive permission signal,
   the safety control unit further includes
   a safety communication unit configured to process safety data included in the communication data in accordance with a predetermined protocol, and
   a safety processing unit configured to output no drive permission signal when the safety data that has been processed by the safety communication unit includes a signal for placing the motor into a safe status.

2. The motor controller according to claim 1, wherein the safety control unit further includes a self-diagnosis unit configured to input a self-diagnostic signal onto an input path for receiving the drive permission signal and determine whether an abnormality has occurred on the input path in accordance with information indicated by the self-diagnostic signal.

3. The motor controller according to claim 2, wherein the motor controller outputs no motor drive command value when the cut-off circuit is cutting off the motor voltage command signal.

4. The motor controller according to claim 1, wherein the motor controller outputs no motor drive command value when the cut-off circuit is cutting off the motor voltage command signal.

5. A motor controller connected to a network, the motor controller comprising:
   a communication circuit configured to transmit and receive a signal through the network;
   a motor control unit configured to output a motor drive command value for driving a motor in accordance with a command value received through the communication circuit;
   a motor drive circuit configured to output a motor voltage command signal for driving the motor in accordance with the motor drive command value;
   an inverter configured to supply power for driving the motor by switching based on the motor voltage command signal;
   a safety control unit configured to output a drive permission signal for driving the motor in accordance with communication data received through the communication circuit;
   a cut-off circuit configured to receive the drive permission signal and the motor voltage command signal, and cut off the motor voltage command signal to the inverter when receiving no drive permission signal; and
   a safety input unit configured to receive a redundant safety input signal,
   wherein the cut-off circuit is configured to receive a logical AND of the safety input signal and the drive permission signal,
   the safety control unit further includes a self-diagnosis unit configured to input a self-diagnostic signal onto an input path for receiving the drive permission signal and determine whether an abnormality has occurred on the input path in accordance with information indicated by the self-diagnostic signal.

6. The motor controller according to claim 5, wherein the motor controller outputs no motor drive command value when the cut-off circuit is cutting off the motor voltage command signal.

* * * * *